United States Patent [19]
Bernard et al.

[11] Patent Number: 4,922,520
[45] Date of Patent: May 1, 1990

[54] AUTOMATIC TELEPHONE POLLING SYSTEM

[75] Inventors: John K. Bernard, Pompano Beach; Hunt K. Brand, Lantana; Richard L. Walker, Boca Raton, all of Fla.

[73] Assignee: M. A. Kempner, Inc., Deerfield Beach, Fla.

[21] Appl. No.: 304,704

[22] Filed: Jan. 31, 1989

Related U.S. Application Data

[63] Continuation of Ser. No. 948,145, Dec. 31, 1986, abandoned.

[51] Int. Cl.$^5$ .................... H04M 1/276; H04M 11/00
[52] U.S. Cl. ........................................ 379/88; 379/92; 379/97
[58] Field of Search ............... 379/92, 88, 89, 67, 379/69, 87, 101, 97

[56] References Cited

U.S. PATENT DOCUMENTS

| | | | |
|---|---|---|---|
| 4,247,910 | 1/1981 | Cornell et al. | 364/900 |
| 4,320,256 | 3/1982 | Freeman | 379/73 |
| 4,406,925 | 9/1983 | Jordan et al. | 379/93 |
| 4,438,296 | 3/1984 | Smith | 379/69 |
| 4,451,700 | 5/1984 | Kempner et al. | 379/88 |
| 4,580,012 | 4/1986 | Matthews et al. | 379/245 |
| 4,599,493 | 7/1986 | Cave | 379/247 |
| 4,659,877 | 4/1987 | Dorsey et al. | 379/88 |

FOREIGN PATENT DOCUMENTS

| | | | |
|---|---|---|---|
| 0199255 | 12/1986 | European Pat. Off. | 379/89 |
| 0107756 | 6/1983 | Japan | 379/88 |

OTHER PUBLICATIONS

"Conversant 1 Voice System: Architecture and Applications", R. J. Perdue et al., *AT& T Technical Journal*, vol. 65, No. 5, Sept./Oct. 1986, pp. 34-47.

*Primary Examiner*—Thomas W. Brown
*Attorney, Agent, or Firm*—Joseph Zallen

[57] ABSTRACT

An efficient, easily-programmed and annoyance-free polling system includes the utilization of multiple voice synthesizers in multiple identical Telephone Interface Units (TIUs) operating independently under control of their own microprocessor, with the TIUs being connected to a bank of telephone lines. A Master Unit with its own voice synthesizer programs the TIUs for simultaneous polling and receipt of polled information. The voice synthesizer in the Master Unit is used for easy message editing and the elimination of "dead time". A personal or other computer is used for initialization, message set up and editing, telephone number generation, and cross-correlation and printing of polling results, with the TIUs working independently for simultaneously polling over many telephone lines. In one embodiment, programming of each individual TIU is accomplished through a specialized coding system unique to polling operations. In one embodiment branching occurs on a non-response or an erroneous answer for improved polling results. Message editing capability and trimming of the outgoing message is provided through the changing of the starting address and ending address of the message.

13 Claims, 5 Drawing Sheets

AUTOMATIC TELEPHONE POLLING SYSTEM

This is a continuation of application Ser. No. 948,145, filed Dec. 31, 1986, now abandoned.

FIELD OF INVENTION

The present invention relates to an improved system capable of automatically conducting a poll, survey or providing information via the public telephone network utilizing a synthesized human voice.

BACKGROUND

The number of Touch Tone (DTMF) and rotary public subscriber telephones in operation in the United States is pervasive. Consequently, extensive use has been made of these telephones to transmit both analog (e.g. voice) and digital (e.g. data) information. It is well known that the public telephone subscriber can obtain a wealth of information by dialing for a prerecorded message. Examples are numerous and include dialing for weather, time, sport scores, and stock quotations. Such examples do not require the use of a computer to store the information requested. Some call in only systems utilize a synthesized voice, with the latter capability being disclosed in U.S. Pat. No. 4,489,438. While this patent also describes multiple interface units, each connected to a different telephone line, each unit is under the control of the main computer at all times and does not operate independently.

Polls, however, require human operators either to ask questions or to gather responses. Pertinent general polling systems are exemplified by the U.S. Pat. Nos. 4,377,870; 4,345,315; 4,258,386; 4,151,370; 4,107,735; 3,950,618; 3,937,889; 3,909,536; 3,906,450; 3,891,802; 3,826,871; 3,794,922; 3,502,813; 3,456,192; 3,210,472; and 3,187,307. Further, the use of synthesized voices to conduct the polling and subsequent subscriber response, by his telephone keyboard or rotary dial, is disclosed in U.S. Pat. Nos. 4,451,700; 4,320,256; 4,084,081 and 3,644,675.

However, none of the above prior art reveals the combination of features provided by the present invention which include virtual simultaneous polling over any number of telephone lines through the use of multiple identical Telephone Interface Units (TIUs), operating independently once a telephone number is transmitted to the TIU by a Master Unit; the use of preselected telephone numbers, or partial random digit dial with predetermined three digit exchanges; the use of an on-site personal computer to generate messages, telephone numbers and cross-correlate polled data; the utilization of the same type voice synthesizers both in a Master Unit for programming the TIUs and in each TIU for simultaneous polling over individual telephone lines once the TIU is programmed by the Master Unit; a programming system having a code especially adapted to polling operations; reduction of "dead time" by specialized branching and by a convenient address-specified message editing; incoming signal recognition by circuitry and TIU programs that approximate an FFT analysis; recognition of a pulse or rotary dialing telephone at the dialed number and reconfiguration of the associated TIU to be able to receive responses from either pulse or DTMF dialers; the request of cooperation in a telephone survey of "X-length"; response by pressing certain numbers at the recipients telephone; call placing until a preset number of valid polls have been attained; prevention of erroneous answers or silence from contaminating polling results; avoidance of having the poll recorded on a telephone answering machine; "call in"/"call out" convertibility; and the use of a personal computer with an associated printer to control initial message set up and editing, to keep track of results, to permit on-site cross-correlation of data and to permit on-site readout and printing for providing highly specific and cross-correlated polling results in near real time on an economical basis.

More specifically, through the increased utilization of polling systems, there has been an increased reluctance on the part of the recipient to answer the polling questions, be it human-generated, generated by tape, or generated by synthesized voice. Current polling systems usually utilize a single voice generating system, be it a tape or a voice synthesizer which must be accessed each time a question is to be asked, or the recipient's answer recorded. These types of systems are increasingly cumbersome because of the number of tape recorders or synthesizers that are necessary and in view of the fact that in most systems, only one outgoing telephone line can be accessed at a time. In the usual case, polling may take place over as much as 6 to 10 minutes, with the particular telephone line being tied up for this length of time. The systems which can only access one speech generator are incapable of doing simultaneous polling over numbers of outgoing telephone lines. Polling problems are exacerbated by virtue of the fact that most of the polling systems, unless manned by operators, are incapable of distinguishing the types of responses given by the recipient with any degree of accuracy such that the systems often misinterpret a ringing signal, a busy signal, a noise signal, silence, or a Touch Tone signal, and thereafter branch to the wrong type of message. Branching to the wrong type of message not only increases the annoyance of the recipient, but also decreases the accuracy of the poll and indeed reduces the credibility of the utilization of these types of systems in general.

One of the most annoying factors when utilizing an automatic polling system is the frequent use of telephone answering machines. There is nothing that annoys a recipient more than the recording of a polling message on a telephone answering machine. Presently, automatic polling systems cannot detect the fact that they are connected to telephone answering machine.

Other problems currently facing the pollster's use of automatic equipment revolves around the correlation of results which often must be manually entered into a different computer for processing. Current systems while able to keep track of answers to individual questions are not capable of on-site cross-correlation of results. What is therefore needed is a system which can correlate, for instance, the number of male users with the number of Caucasians, with the number of answers, as to whether the person is a Democrat or Republican, along with a correlation as to age and a correlation as to geographic area.

It will be noted that the most accessable method of correlation to geographic area is the telephone exchange. Thus, a system which is capable of programming exchanges ahead of time results in a system capable of analyzing polling results on an area by area basis in real time.

The economical utilization of automatic polling systems also is dependent upon obtaining valid responses and eliminating those responses which are not valid.

Not only does the elimination of non-valid responses permit more efficient use of the equipment so that the polling can take place more quickly, the contamination of the polling results with non-valid response is indeed an important feature not immediately available in present day equipment.

Importantly, the most economical method of polling is the ability to be able to use a multiplicity of outgoing telephone lines in such a manner that simultaneous polling can be achieved over a number of telephone lines, so that the entire poll can be conducted over a relatively short and specifically designated period of time. Moreover, the speed with which the polling can take place, rather than being dependent upon polling over a given length of time, is preferably a polling system which shuts down after a predetermined number of valid answers have been received in a given area. The system should also be actuated only over a predetermined time period such as at night after recipients are usually in their own homes.

Finally, it is very important to be able to readily encode messages and provide for multiple type of branching based upon the answers given, with a minimum amount of "dead time" so that the recipient has very little opportunity to hang up. Messages must be appropriate, easily edited, and "natural sounding", so that a natural sounding message is transmitted, with "dead time" between the initial message and any following messages being virtually eliminated The importance of the elimination of "dead time" cannot be overemphasized in view of the fact a recipient given even a small amount of "dead time" may feel embarrassed about answering a "computer's" questions and hang up the telephone, as opposed to being encouraged to answer the poll.

SUMMARY OF THE INVENTION

In order to provide for less-annoying, easily programmable, and a more efficient polling system, the Subject System automatically conducts a scientific public opinion poll. This system utilizes a synthesized human voice to poll individual public telephone network subscribers, then stores and analyzes their telephone responses from either a Touch Tone keyboard or rotary dial, in near real time to cross-correlate poll results in the form of a computer printout. The system consists of a number of major parts, including a personal computer with keyboard and printer, a Master Unit having a microprocessor and voice synthesizer, and a group of identical Telephone Interface Units (TIUs), each having the same type of synthesizer and microprocessor as the Master Unit. Moreover, each TIU includes special circuitry to place and receive calls and to recognize the types of signals from the recipient's telephone. Under control of the personal computer, the digitizer and microprocessor in the Master Unit both initialize all the TIUs with messages and interface the personal computer via a RS232 serial port with the TIUs. The personal computer, used to control the system, provides operator input and output and produces graphic printouts of the subscriber-keyed responses. The analog-to-digital converter in the Master Unit converts analog audio to digital signals for transmission to each TIU dynamic random access memory (DRAM), one TIU being required for each line used for the polling. The Master Unit also governs the transfer of data to and from the personal computer. Finally, the TIUs are connected to the public telephone network via a specialized analog card to establish calls, to monitor call progress, to provide synthesized audio messages, to detect DTMF and dial telephone responses, and to provide status and results to the Master Unit for computation by the personal computer.

The subject is thus an efficient easily-programmed and non-annoying polling and data aquisition system which includes, either singly or in combination, the utilization of identical voice synthesizers in a polling system for quick branching and easy message editing, as well as for the elimination of "dead time"; the provision of unique formatting or coding systems for ease of message formatting and results in retrieval in which the number of numbers dialed back, specific numbers dialed back, or numbers within a given set of numbers dialed back can be selected; branching to a new message set if a pulse dialed telephone is reached; the use of a personal or other computer for initialization, message set up and editing, telephone number generation, and on-site response cross-correlation and printout; and, the use of a Master Unit as an interface to a number of identically-configured Telephone Interface Units, each once initialized, operating virtually independently for simultaneous polling and receipt of information over a number of telephone lines, once telephone numbers have been inputted into the particular TIUs from the personal computer. The personal computer and Master Unit are also provided with a token-passing system to ascertain the identity of a particular TIU and its condition as to whether it is to receive a telephone number or dump its stored received responses back to the personal computer for analysis. Utilization of multiple TIUs permits simultaneous or near-simultaneous polling, with the only time that the TIU is dependent on the personal computer being the time that a particular telephone number is inputted into its memory and the time it dumps its information back through the Master Unit to the personal computer.

Programming of each individual TIU is accomplished through the Master Unit which simultaneously programs all TIUs with particular message and branching sequences. The use of the same type of voice synthesizers in each TIU and the Master Unit permits random access and branching, as well as editing capability for the elimination of "dead time" in telephoning, thereby to minimize annoyance of the recipient and consequent non-response. Branching without the use of a single source of voice messages, such as multiple tape recorders or a single all-purpose synthesizer, permits flexibility through the utilization of individual voice synthesizers and independent computer control within each TIU.

On-line computer cross-correlations permit generation of highly tailored statistics from the responses, as opposed to mere tallies of results, to provide demographic or other profiles, which cross-correlated statistics are available in printed form from the personal computer's printer on a timely basis.

Branching is aided by a unique inexpensive equivalent to a spectrum analyzer which analyzes the incoming signals to ascertain a ringing condition, a busy condition, a voice condition, a noise condition and recipient silence. This is accomplished by clipping the incoming signal so that it provides pulses and then determining the type of signal that is coming in by detecting the time difference between rising edges of adjacent pulses, with correlations of the spectral content of the incoming signal in different frequency channels being utilized to further ascertain with a high degree of accuracy the type of incoming signal. This unit is also utilized to detect the presence of a tape recorder at an answered telephone by the detection of continuous voice over a predetermined period of time, usually eight seconds, at which point the system hangs up rather than leaving a lengthy message. This eliminates annoyance of polling messages recorded on home telephone answering machines. This spectrum analyzer hybrid also permits the utilization of expanded criteria for branching by permitting the ignoring of noise transients.

Branching decisions are based on answers, with branching to another sequence on a non-response or an erroneous answer being important because it prevents contaminating the polling with erroneous answers. A Dual Tone Multiple Frequency (DTMF) detector is utilized to detect answers from so-called Touch Tone or DTMF systems, whereas a specialized system is utilized for rotary or pulse dialers in which noise introduced via long distance telephone networks is discriminated against through the asking of a recipient to dial a particular number and measuring the time duration of the noise generated during the pulse-dialed response. Other pulse-dialed numbers are then detected by virtue of the existence of the same type of noise over a predetermined multiple or fraction of the time period of the noise generated by the original pulse-dialed number. Thus, pulse dialing of a recipient's telephone is detected in one embodiment through detection of a number of noise pulses within a predetermined time period followed by a predetermined silence. In summary, due to the noisy nature of pulse dialing, the subject system in one embodiment detects a certain pattern of noise "hits" in a period to ascertain the numbers from pulse dialing telephones.

Programming of the speech synthesizer in the Master Unit is accomplished during an initialization procedure to provide "natural speech", with the method of speech synthesis also providing editing capability and trimming of the outgoing message through the changing of the starting address and ending address of the message.

Polling in telephone groupings in which the first three digits are selected for given exchanges, followed by four random numbers permits convenient fast designation of polling areas, as well as an efficient means of generating random telephone numbers with given exchanges. This feature also assists cross-correlation.

Moreover, in one embodiment, the system is inactivated after compiling a predetermined number of responses which are determined to be valid, with the system also being programmable not to call out during certain periods during the day, or to be programmed to call out only during certain periods of the day.

Finally, "call in"/"call out" convertibility permits the system to be configured either in the normal polling system configuration in which numbers are randomly dialed, messages given, and results cross-correlated; or a dial-in system is provided in which no telephones are dialed. This is accomplished through the utilization of the storage associated with the aforementioned TIUs, and a detector which detects when a TIU is receiving an incoming telephone call.

BRIEF DESCRIPTION OF THE DRAWINGS

These and other features of the Subject Invention will be better understood taken in conjunction with the Detailed Description and the Drawings of which.

DETAILED DESCRIPTION

Figure 1:
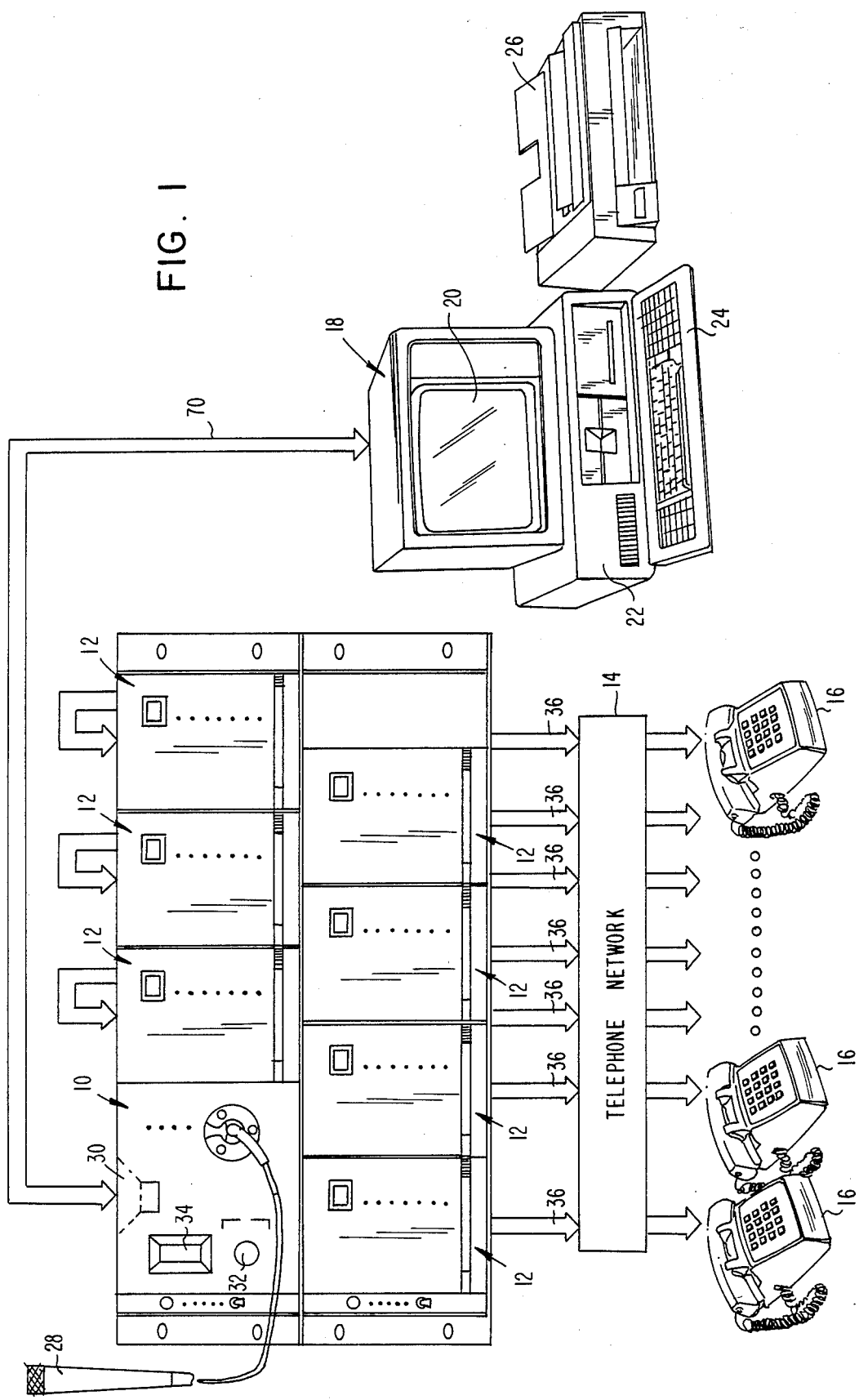
FIG. 1 is a diagramatic representation of the subject system illustrating the utilization of a personal computer, a keyboard, and associated printer, along with a rack containing a Master Unit and a number of Telephone Interface Units connected to a telephone network and thence to individual recipient telephones.

Referring now to FIG. 1, the subject polling system in general includes a Master Unit 10 and a number of Telephone Interface Units 12, each of which is individually connected to a different line in a telephone network 14, which in turn routes each individual TIU to an individual telephone 16. Master Unit 10 is driven by a computer 18, in a preferred embodiment, a personal computer which has, as is usual, a display 20, a memory and processing unit or CPU 22, a keyboard 24 and optionally a printer 26 for printing out cross-correlated polling results.

The polling system in general works basically in two modes of operation. The first mode of operation is the "call out" mode in which exchanges are automatically dialed through the programming of the personal computer which routes the telephone numbers through the Master Unit to a "free" TIU to dial out the particular number. The personal computer generates telephone numbers in accordance with a predetermined sequence or a predetermined set of exchanges, plus randomly generated four digit numbers. The "call out" mode is utilized to ascertain information from the recipient through the utilization of a synthesized voice and cueing system which is programmed into the Master Unit by virtue of computer 18.

This initial programming is transferred to each TIU such that each TIU operates independently once having been programmed by the Master Unit, and once having received a telephone number to be dialed. The Master Unit therefore serves the function of initializing all of the TIUs by synthesizing the voice messages to be transmitted, ordering the messages, and providing the branching instructions upon receipt of responses by the recipient or incoming signal type. The Master Unit then serves the function of routing to the TIUs the telephone numbers to be dialed and routing to computer 18 via an RS232 interface, the information obtained through the polling such that cross-correlation can be performed by computer 18 and then printed out via printer 26.

Thus, unique to this system is the utilization of a Master Unit to synthesize the voice to be transmitted via microphone 28, editing of the messages to be transmitted, and the instantaneous replay of the messages prior to the programming of the TIUs via an internal speaker, here illustrated in dotted outline by reference character 30. The volume of the recorded message is controlled via a front panel control knob 32 and the level thereof is adjusted in accordance with a bar graph LED type display 34.

It will be appreciated that each of the TIUs is connected to the telephone network via telephone lines 36 such that the system can simultaneously poll large numbers of exchanges through the use of identically configured TIUs, each with its own synthesizer and microcomputer similar to those of Master Unit 10. The use of the synthesized voice precludes the necessity of using a single synthesizer for the entire system, be it a tape or an electronic device. The use of identical synthesizers in each of the TIUs prohibits the results from the polling being skewed because a uniform polling voice is utilized. The packaging is, of course, much smaller than that which would be required when using multiple tape machines; and the ability to edit and access different messages is made considerably easier due to the ability to address the synthesizers both in the Master Unit and in the TIUs. Thus branching can occur without multiple tape recorders, with each of the synthesizers being addressable and independently controlled by the microprocessor in each TIU. As will be described, the utilization of the synthesizer and its associated memory permits editing through the utilization of start and end address specifications which reduce the amount of "dead time" in telephoning, such that the branching may be accomplished quickly.

Thus the utilization of a voice synthesizer and duplicate CPUs and memories in each of the TIUs permits virtual simultaneous polling, since, once provided with a telephone number, each Telephone Interface Unit can call out independently and separately on the telephone line without access to any main computer or any shared synthesizer or tape. The Telephone Interface Unit therefore accomplishes all of the functions necessary in polling, with the multiple Telephone Interface Units being both small in size, programmed initially by the Master Unit and left alone thereafter to perform the particular polling task.

As will be described, a specialized software-implemented spectrum analyzer is utilized to distinguish ring signals, busy signals, or noise to permit branching based on the type of signal that is detected. Moreover, software Fast Fourier Transform (FFT) detection of pulse dialing at a recipient's telephone, the presence of a telephone answering machine, or the presence or absence of voice, aids in the operation of the subject polling system and makes it both efficient and less-annoying for recipients.

Another feature of the subject invention is that branching based on answers is provided within each Telephone Interface Unit, which branching can be preprogrammed by computer 18 or can be a branch due to a nonresponse to a question or an erroneous answer. Branching on an erroneous answer is particularly important because is prevents contaminating the poll with erroneous answers. Thus the poll is a result of valid answers and assures more accurate results.

With respect to the programming of the speech synthesizer of the Master Unit, an analog-to-digital converter is utilized followed by a CPU and memory which in turn outputs message signals to a digital-to-analog converter which produces a natural sounding voice. This is important with respect to polling because of the uniformity of the voice utilized in the poll and because of the generation of "natural speech" which can duplicate the speech of any individual and therefore can be made to be recognizable. This is in contradistinction to computerized speech which would aggravate those being polled to the point that they may hang up. In the subject system an OKI model MSM5218RS is used.

Further, with respect to the use of the personal computer, the polling may take place in selected telephone groupings; with the first three digits being preselected for given areas, e.g. exchanges, and with the remainder of the numbers being generated in a random fashion to provide for the best random sampling possible.

As mentioned hereinbefore, trimming and editing of the outgoing message through the changing of the starting address and ending address, permits quicker access and effective trimming with less "dead time" which is objectionable to the respondent. Thus, with the subject trimming techniques, the results are professional-sounding messages which can be edited easily without a number of retakes.

Moreover, the entire polling system, while it can take place over a given time period can be inactivated after compiling a predetermined number of valid responses. Additionally, the system can be programmed not to call during certain periods of the day.

As a further feature, each of the TIUs includes a pulse dialing detector in software which detects numbers of signal pulses within a predetermined time period and a predetermined silence period, such that if there are the prescribed numbers of pulses and silence, it is assumed that pulse or rotary dialing has been utilized by the recipient. Since either a Touch Tone (DTMF) telephone or a pulse dialing telephone may be reached and since the Touch Tone telephone has more capability, it is important to know the type of telephone connected to a given TIU.

The subject system also has a "call in" feature which can be switched by software selections from the personal computer from the "call out" polling just described. For purposes of the subject invention, "call in" means that rather than accessing telephone network 14 with a sequence of either preprogrammed or randomly generated numbers, the system, in this mode of operation, receives the calls from individual network users. These individual calls are routed to "free" TIUs, at which point the function of the TIU is identical to the "call out" functions described before. The telephone network selects which of the TIUs the incoming call is routed to and hunts for an unused or free TIU, with the TIU sensing incoming ring signals.

Figure 2:
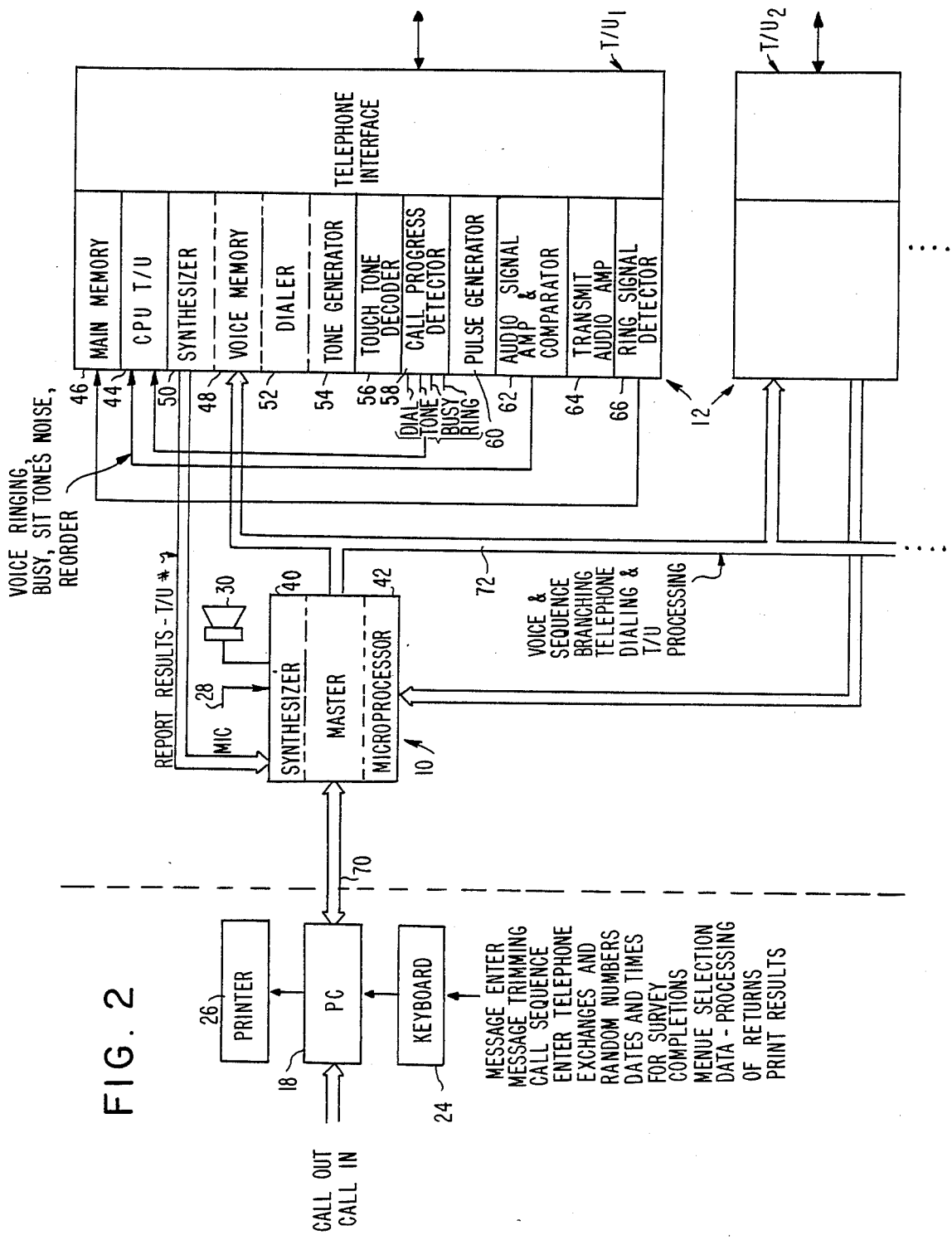
FIG. 2 is a block diagram illustrating the Subject System in which the elements of FIG. 1 are described in more detail, including a further functional description of each individual Telephone Interface Unit of FIG. 1.

Referring now to FIG. 2, as can be seen, computer 18 along with printer 26 and keyboard 24 is utilized through a RS232 interface 70 to drive Master Unit 10 which is diagramatically shown in this figure and includes a synthesizer portion 40 and a microprocessor 42. As will be described, microprocessor 42 includes a CPU and associated memories. This is an important feature of the subject invention in that the synthesizer, as well as the functions performed by the TIU are connected by a handshake through the individual CPUs of each of the individual TIUs. The system of driving and processing the outgoing signals, as well as the incoming signals by utilizing a main memory and a CPU in each TIU which duplicates, to a certain extent, the main memory and CPU in the Master Unit permits the main memory and CPU of each of the TIUs to perform the numerous tasks involved in the polling system without having a centralized computer which must be accessed on a time-shared basis in order that the polling functions be performed. This also permits a general solution of providing outgoing messages and processing of incoming information through the utilization of software-driven apparatus. As will be described, hardware in each TIU provides for tone decoding, call progress detection, tone generation, dial-pulse generation, ring-in detection, and a dial ringing output (DRO) detection, i.e. detection that a telephone number is being dialed.

Referring back to FIG. 2, each TIU 12 includes its own CPU 44, its own main memory 46, a voice dynamic memory 48 coupled to a synthesizer 50, its own dialer 52 which is under the control of its CPU, its own tone generator 54 such as National model TP5088, a Touch Tone decoder 56 such as Teltone model 957 and a call progress detector 58. Call progress detector 58 is commercially available as Teltone model 982 which detects a dial tone signal, a busy signal, or a ringing signal for purposes of the aforementioned branching. The TIU also includes a pulse generator 60 such as Motorola model MC14408 and an audio presence signal amplifier and comparator 62 which amplifies the incoming audio signal and squares up the incoming signal through the utilization of a comparator type clipping circuit. This is used to produce pulses for signal recognition by the equivalent of a Fast Fourier Transform analysis system, in which the frequency of the incoming signal is utilized by the CPU in the TIU to reliably determine ringing, busy, noise, and voice signals by software processing techniques, thereby to permit branching upon signal types which heretofore have been difficult to detect.

The TIU also includes a transmit audio amplifier 64 such as National model LM3900 as will be described, as well as, a ring-in signal detector as part of the telephone interface circuits such as Cermetek model 1810 utilized in the "call in" mode of operation.

It will be appreciated that in operation, the system is initialized through utilization of keyboard 24 which configures the Master Unit to accept the entering of a message into the synthesizer portion of the Master Unit by virtue of microphone 28. The keyboard control also permits message trimming through the utilization of start and end addresses, and establishes the sequence or format for the message transmission and receipt of polled information. This information is the result of the recipient dialing in a number. The keyboard provides preprogramming for the telephone numbers to be dialed either directly or through the utilization of exchanges plus random numbers, and permits defining the dates and times for the survey. The number of completions and the maximum number of calls to attempt are also programmed in at the keyboard. The personal or other computer processes the polling returns and prints out the cross-correlated results in any of a number of predetermined formats, as well as providing a menu selection function so that the user is easily prompted to configure the system for his own particular purposes.

MASTER UNIT

Referring to FIG. 2, in order to implement the menu-driven inputs, computer 18 is coupled to Master Unit 10 by an RS232 interface cable 70 which, upon appropriate command, permits the Master Unit to digitize the messages to be transmitted through the polling system and provides an immediate ability to read out and edit through the aforementioned speaker 30. The output of the Master Unit is coupled via data and address busses 72 to each of the TIUs through a back plane attachment system so that the voice-in sequence can be programmed into the TIU, as well as the branching format which is utilized in the polling process.

Figure 3:
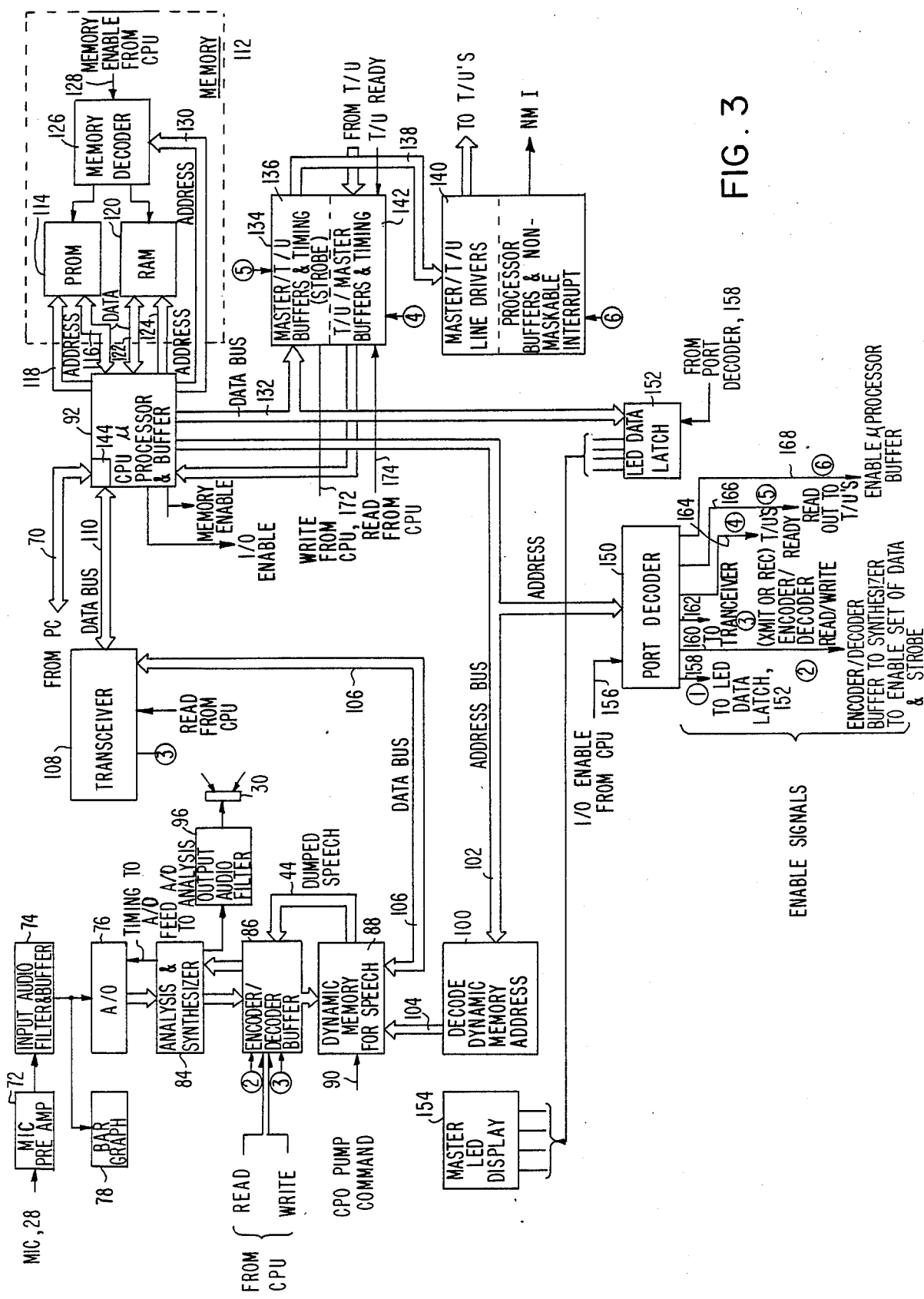
FIG. 3 is an expanded block diagram of the Master Unit of FIGS. 1 and 2.

Referring now to FIG. 3, microphone 28 is coupled to the Master Unit through amplifier 72 which is in turn coupled to an input audio filter and sample-and-hold buffer 74. This buffer is, in turn, coupled to an analog-to-digital converter 76. A bar graph display 78 is provided which includes a bar graph driver and a LED bar graph display 82 of FIG. 7, as will be described hereinafter.

Analog-to-digital converter 76 is coupled to an analysis and speech synthesizer unit 84 which, in one commercial embodiment, is an OKI model MSM5218RS unit. Output of the synthesizer 84 is coupled to an encode/decode-buffer 86 which, in turn, is coupled to a dynamic memory 88, which dynamic memory is utilized for the digital storage involved in the generation of the speech. As can be seen, upon a dump command over line 90 from the Master Unit's CPU 92, the dynamic memory is dumped via bus 94 back through the encode/decode buffer 86 through speech synthesizer 84 and then out to the output audio filter 96 which drives speaker 30. The dynamic memory for the speech is controlled by address decoder logic 100 to decode dynamic memory addresses over bus 102 from CPU 92 and provide the appropriate address to the dynamic memory by an address bus 104.

It will be appreciated that the output of the dynamic memory for the speech is provided over a data bus 106 to a transceiver 108 between the dynamic memory and CPU 92. Transceiver 108, is connected to CPU 92 via a data bus 110. The CPU includes a microprocessor and a buffer and is coupled to a Master Unit memory generally indicated by dotted box 112 to include a PROM 114 connected to the CPU via data bus 116 and address bus 118; and to a RAM 120 connected via data bus 122 and address bus 124. The PROM or the RAM is enabled alternatively by a memory decoder 126 which is controlled by a memory enable line 128 from CPU 92 to either activate the RAM as a scratch pad memory, or the PROM which is the software drive. Note that memory decoder 126 is driven via an address bus 130 which is coupled to the CPU 92.

CPU 92, along with its microprocessor and buffer, is utilized in one instance via a data bus 132 to drive one portion of a TIU/Master buffer and timing unit 134 which includes, in essence, two sections. The first section is the Master/TIU buffer 136 and timing strobe subunit which serves to couple data generated by CPU 92 via bus 138 to Master/TIU line drivers 140, which in turn couple data and strobing to the TIUs. Unit 140 includes buffers for a non maskable interrupt signal, NMI, which, in general, is used to instruct the TIUs to look at the data, e.g. the output of the line drivers which are strobed or sampled at a given time.

The second portion of unit 134 is the TIU/Master buffers 142. It is utilized to transmit information or data from the TIU to the CPU of the Master Unit. This information is then processed and read out through the RS232 interface cable 70 to computer 18 so that the responses, properly processed by the Master Unit, can be analyzed by computer 18. The RS232 interface, as will be described hereinafter, is illustrated by reference character 144.

An LED latch 152 coupled to data bus 132, drives master LED display 154, which provides a visual representation of the mode of operation of the Master Unit in terms of an "operate" mode, "test" mode and at least two "alarm" modes to, for instance, indicate whether or not there is proper communication between computer 18 and the Master Unit or between the Master Unit and the TIUs.

The aforementioned address bus is also utilized to control a port decoder unit 150 which serves a number of functions critical to the operation of the Master Unit. In general, the port decoder provides a number of "enable" signals, as will be described.

The enable signals from the port decoder are controlled via signals over an I/O line 156 from CPU 92. The enable signals from the port decoder are delivered over lines 158-168 such that the enable signal on line 158 enables the LED latch 152; the enable signal over line 160 enables the encoder/decoder buffer to the synthesizer, i.e. encoder/decoder unit 86 to set the parameters for the synthesizer is terms of the number of bits and the frequency for proper analysis and synthesis; the enable signal on line 162 and Read or Write commands from the CPU 92 configures transceiver 108 in either a transmit or receive mode; and encoder/decoder unit 86 in either a corresponding READ or WRITE mode; a signal over line 164 configures via TIU/Master buffer and timing unit 142 to indicate to the Master Unit CPU 92 that all of the TIUs are ready for the next global communication; enable signal over line 166 which is coupled to subunit 136 reads out information or data to the TIUs; and enable signal over line 168 which is coupled to unit 140 enables the microprocessor buffers for the transmission of data to the TIUs. It should be pointed out that the TIU READY line from the TIUs enters subunit 142 and is enabled via a signal over line 164 to transmit the TIU READY indication to the CPU via the data bus 132.

Note that there is a WRITE line 172 which is coupled from CPU 92 to subunit 136 and a READ line 174 which is coupled from CPU 92 to subunit 142 for the control thereof.

It will be appreciated that throughout the subject system numerous data busses are shown for ease of description. Also shown are a number of address busses likewise to facilitate the description of the invention. In practice, however, only one data bus is utilized and only one address bus is utilized for the proper control of the relevant units.

TELEPHONE INTERFACE UNIT

Figure 4A:
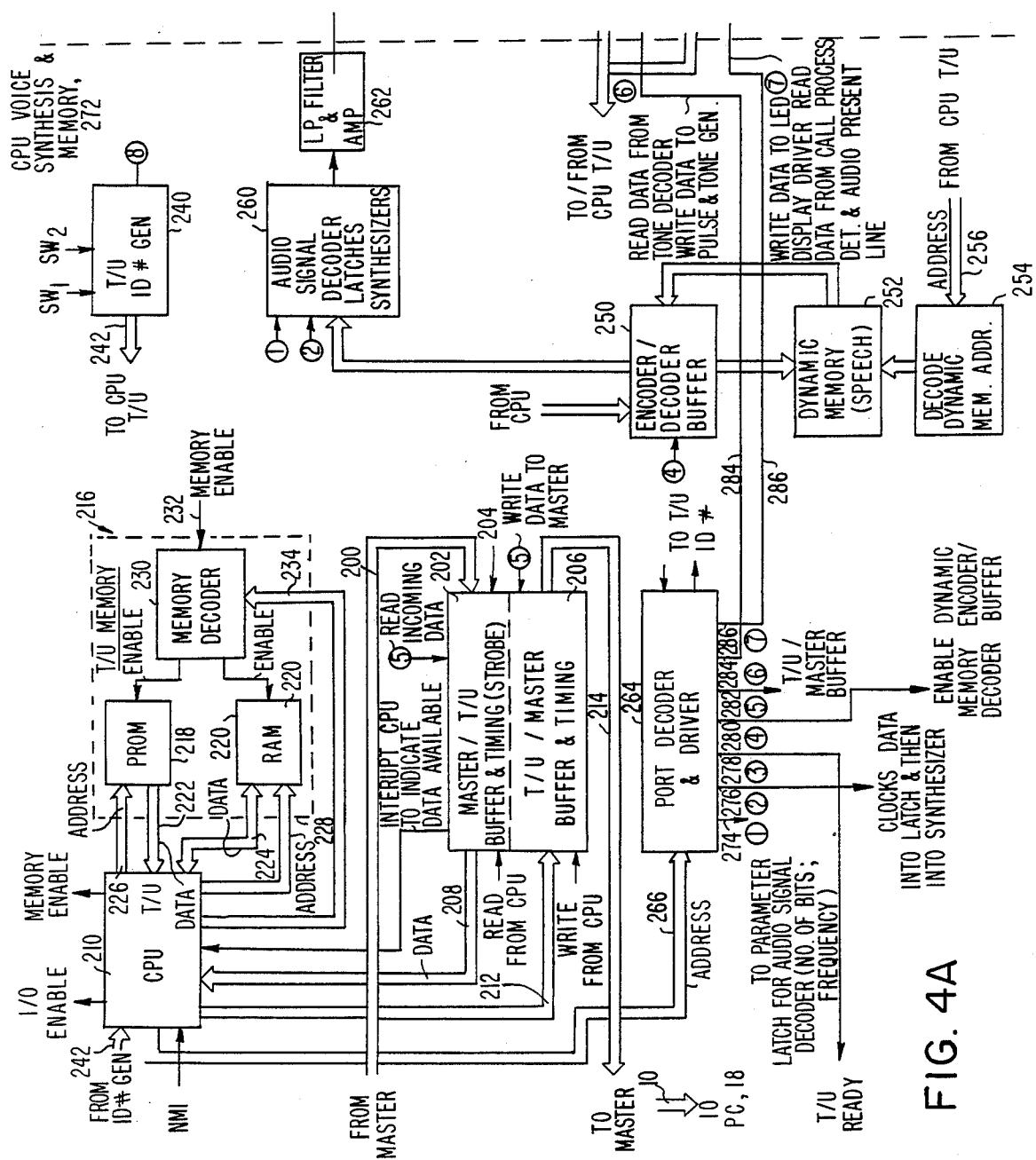
FIG. 4A is a block diagram of the CPU, voice synthesizer and memory for each of the Telephone Interface Units of FIGS. 1 and 2.

Referring now to FIG. 4A, the CPU memories and synthesizer of each TIU emulate or are made to emulate the corresponding units in the Master Unit. More specifically, the microprocessor section, the PROM and RAM, the TIU/Master buffer, the Master/TIU buffer, the memory decoder, the port decoders and drivers, the transceivers, the address decoder and main memory dynamic RAM emulate those of the Master Unit, with the exception that the main memory dynamic RAMs for each TIU have four times the capacity of those of the Master Unit because they must store the entire outgoing voice messages, whereas the Master Unit only stores one at a time. Thus, the data bus from the Master Unit here illustrated in FIG. 4A by reference character 200, is coupled to a Master/TIU buffer and timing subunit 202 of a composite unit 204 which includes the TIU/Master buffer and timing unit 206. It is the purpose of this unit, amongst other things, to provide data over a bus 208 to the CPU 210 of the TIU. Likewise, data from CPU 210 is delivered over a bus 212 to TIU/Master and buffer timing unit 206 to be transmitted via bus 214 to Master Unit 10 and then via the RS232 interface 70 to computer 18, so that the information derived during polling may be processed. The CPU in each TIU includes a memory, in general illustrated by dotted box 216, to include a PROM 218 and a RAM 220, respectively having data busses illustrated at 222 and 224 and address busses illustrated at 226 and 228; with the PROM and RAM being under the control a memory decoder 230 which is driven by a memory enable line 232 and is addressed via an address bus 234.

Each TIU includes an identification number generator 240 which is preset by switches SW1 and SW2 to provide a unique code over data line 242 to CPU 210 within the TIU. This uniquely identifies the active TIU for purposes both of dialing out and transmission of information to the recipient as well as receipt of the polled information from the recipient.

CPU 210 also drives an encoder/decoder buffer 250, which, in turn, drives a dynamic memory 252 which is under control of an address decoder logic 254 that receives addresses over address bus 256 from CPU 210. The purpose of this portion of the dynamic memory is to drive the speech synthesizer through the encoder/decoder memory 252 and the audio signal decoder and latch circuit 260 which serves as the speech synthesizer for the individual TIU. The output of synthesizer 260 is coupled to a low pass filter and amplifier 262 which is coupled to an analog card 270 to be described hereinafter.

It will be appreciated that the CPU, voice synthesizer, and memory is carried on a separate card 272, although the functions as described here interrelate as will be seen. As described before, a port decoder and driver 264 is driven via an address bus 266 from CPU 210 to provide a number of enable signals over lines 274-286. The enable signal on line 274 is coupled to synthesizer 260 to set the parameters for the synthesizer in terms of the number of bits and the frequency for proper synthesis. The signal over line 276 clocks the data into the latch portion of the synthesizer and then to the synthesizer circuitry. The enable signal transmitted over line 278 is the aforementioned TIU READY signal which is transmitted back to the Master Unit. The signal transmitted over line 280 is coupled to encoder/decoder 250 to enable the dynamic memory encoder/decoder buffer. The enable signal transmitted over line 282 enables the TIU/Master buffer to enable this unit to send data back to the Master Unit. The enable signal transmitted over line 284 is transmitted to the analog card of FIG. 4B to a microprocessor interface which includes a data interface 292 and a signal interface 294.

Referring back to FIG. 4A, the enable signal over line 284 is coupled to data interface 292 to read data from a Touch Tone or DTMF decoder 296 and to permit the writing of data into a dial-pulse generator 298 and a tone generator 300 as required. Thus an enabling signal over line 284 either reads the results of the DTMF decoder 296 back to the TIU memory or writes data both into the dial-pulse generator 298 or the Touch Tone generator 300 depending on which mode of operation is selected by a switch S2 coupled to the dial pulse generator and then to the telephone line interface and buffer amplifier 302 which determines whether Touch Tones are transmitted over the telephone network or pulses. Switch S1 sets the number of pulses/sec i.e., 10 or 20. In order for the Touch Tone generator to provide the appropriate tones they are amplified and buffered by a transmit audio amplifier and buffer 304, which is also coupled to the output of the low pass filter and amplifier 262 to transmit the synthesized voice over the telephone line.

The enable signal over line 286 is coupled to signal interface 294 either to write data to an LED display driver 306 or to read data from a call progress detector 308 or the audio present line detector 310 whose functions will now be described.

With respect to call progress detector 308, signals from the telephone line interface buffer and amplifier 302 are applied thereto, with this hardware circuit determining whether the signals over the connected telephone line reflect a dial tone, a busy signal, or a ringing signal.

With respect to the audio present amplifier and comparator 310, this unit is connected to the telephone line interface buffer and amplifier and thence to the signal interface 294 and CPU of the TIU which indicates via a signal over the appropriate line that an audio signal is present which may represent either noise, a voice, or any incoming audio signal which may be used for any of a variety of purposes. The processing by the CPU constitutes the software analysis of the incoming signal to identify the type of signal coming in. In one embodiment, preference is given to the software analysis versus the hardware analysis of the call progress detector. Here detector 308 is used to check the software analysis. Alternatively, the roles can be reversed.

With respect to the LED display driver 306, this driver is utilized to indicate an "off hook" condition, a dial tone receipt, the presence of ringing, the on going polling operation, or an alarm condition such as the non-receipt of a dial tone.

Figure 4B:
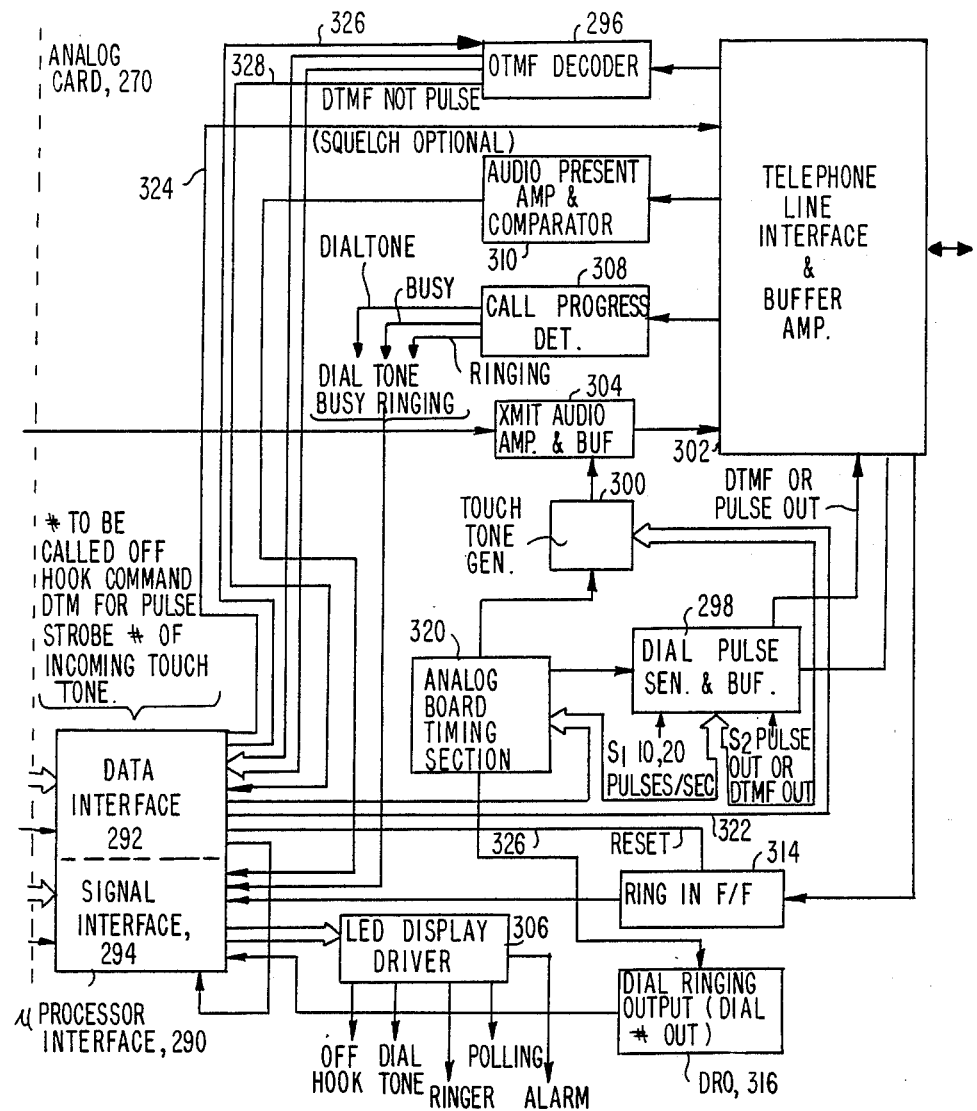
FIG. 4B is a block diagram of the analog circuitry utilized in the Telephone Interface Units of FIGS. 1 and 2.

Referring to FIG. 4B, it will be appreciated, as seen from the diagram, that there is a two-way data bus going from the CPU 210 of the TIU to the microprocessor interface 290 in that there is two-way communication over the data bus with respect to the data interface subunit 292, whereas a signal interface subunit 294 also is coupled to this two-way bus. The purpose of the signal interface unit is to hand off to the TIU's CPU the hardware-derived presence of a dial tone, a busy signal, a ringing signal, an audio presence signal, and a ring-in signal developed in the telephone line interface 302 is stored in the ring-in flip-flop 314, the purpose of which is to establish that an incoming call has been received. The ring-in flip-flop is, as illustrated, coupled to the telephone line interface buffer and amplifier for this purpose. Note, for the "call in" mode, the reset signal from data interface unit 292 is coupled to the ring-in flip-flop 314 to reset the ring-in flip-flop to receive the next call after the present call is finished.

Also provided is a dial ringing output (DRO) signal from DRO unit 316 which is coupled to signal interface subunit 294, with a signal therefrom indicating that a dialing operation is occurring. It will also be appreciated that the TIU includes an analog timing section 320 which has output signals to control the dial pulse generator 298, the Touch Tone generator 300 and to enable DRO unit 316; with signals from the analog board timing section permitting the dialing of numbers derived from the data interface subunit 292 over data bus 322.

Also shown is an enable line from data interface subunit 292 to the signal interface subunit 294, which is an Intel model 8212 interrupt that indicates to the CPU that there is data in the 8212 storage register, with the presence of an enable signal on this line indicating that the DTMF decoder has determined that incoming DTMF data is present and has been latched in the 8212 register, which data is ready to be read out to the TIU's CPU, in this case CPU 210.

As an optional feature, an enable signal from the data interface subunit 292 over line 324 may be utilized as a squelch control for the telephone line interface buffer amplifier 302.

It will also be appreciated that the data interface subunit 292 produces a reset signal over line 326 to the DTMF decoder 296 after a call is finished, whereas DTMF decoder 296 produces a signal over line 328 back to the data interface unit 292 indicating that the incoming line is a DTMF line, not a pulse line. If the incoming line to which the TIU is connected via the telephone interface unit 302 is a line which is connected to a pulse dialing telephone, it would therefore be important to note this so that specialized processing may be instituted in order to obtain information relative to polling. Alternatively, information from pulse dialing telephones may be ignored.

OVERALL OPERATION

An understanding of how the subject system operates will be evident from the following example of how the user sets up, runs, and displays the results of a scientific public opinion poll or survey. Note, menus provide the user with a series of prompts to guide him through the entire set-up, run, and display results sequence.

First, the user turns on his personal computer and enters the correct date and time on his monitor via his keyboard. The personal computer then automatically loads the operating program. Following notice of the copyright and clear RS232 page, the user obtains the Master Menu on his monitor by pressing ANY KEY on his keyboard.

Pressing S provides the user with the Set Up Survey Menu. Information for each of the first four items, i.e.. V, F, P, and T must be recorded or entered into the system prior to running the survey. Accordingly, the user presses V, which results in a Record Voice Messages Menu appearing on his monitor. He then is prompted through a series of steps to record his message at the proper audio level, controlled by adjusting the Audio Level meter on the Master Unit panel and with the proper message length, "X". When this has been done, the user presses S, which sends the recorded message to the TIUs. A Data Transfer Light Emitting Diode (LED) in each TIU turns on during the recorded message transfer and turns off when the transfer is completed. A similar procedure is required for each different message to be recorded. After all such messages have been transferred to the TIUs, the user presses X to exit the Record Voice Messages segment and return to the Set Up Survey Menu.

Next the user presses F to record the flow control, i.e., to determine which message is to be sent over the telephone lines and when it is to be sent. Pressing F provides the user with a Record Flow Control Menu on his monitor. In the Current Flow Chart example, "A" signifies the first message, "B" the second, "C" the third, etc.; the numbers 1, 2, 3, etc., representing responses from the person being surveyed. The dash "-" indicates the start of a voice message whose symbol follows. Thus A1B2C3D-BE-CE-DE-E indicates that message "A" followed by response "1" triggers message "B", which with response "2" triggers message "C", with which response "3" triggers message "D", etc.. Pressing I allows the user to input new flow chart data and then pressing S sends the data to the Master Unit microprocessor for storage. When this has been done the user presses X to return to the Set Up Survey Menu.

The next item that must be recorded is the telephone information and the user accordingly presses P. This results in the appropriate Telephone Menu. From this menu the user has three choices of telephone numbers to call; that is, numbers arising from a random number generator, a user generated list, or a purchased list. The user selects which of the three he wishes by pressing R, U, or P and enters the required input data as directed on his monitor prompts. When such input data has been entered, the user presses X and returns the user to the Set Up Survey Menu.

The final item that must be recorded before a survey run can be made is the survey schedule itself. The subject system allows the user up to three sets of start and stop times for each day of the survey. By pressing T on the Set Up Survey Menu the user obtains the Record Survey Schedule Menu. After the proper entries have been made the user presses X to return to the Set Up Survey Menu. A second pressing of X returns the user to the Master Menu. At this point all the needed input information has been entered and the user is ready to run the survey.

By pressing R on the Master Menu, the user obtains an Initializer Menu which allows "C" clearing all old data before statring a new survey. "V" is the same as "C" but saves voice messages to hard disc first or "R" to re-start an existing survey as if never stopping, or X for Master Menu then obtains [if not "X"] a Run Survey Menu. Then items D, V, T, B, and C on this menu are intended for testing and checking the system prior to the actual running of the survey, which is done automatically on the scheduled time and data, if the system is not in the Dial Test mode or can be accomplished by pressing S. Pressing P provides the user with a real time printout of the survey results to present as they are obtained while the survey is in progress. When the survey has been completed, if the user chooses to terminate the survey at any time he may do so by pressing E. By pressing X he returns to the Master Menu.

After the survey has been completed, the results obtained can be analyzed by the Display Results programs. These programs analyze the active survey results to provide the desired information. Access to the display results is obtained by pressing D on the Master Menu which provides the Display Results Menu. If the survey was conducted by using random number generated telephone calls, the user presses M, which allows him to select and analyze only the responses from particular exchanges out of a possible 300 exchanges. If the survey was run with either user or purchased list telephone numbers, he skips option "M". In either case the user presses S, which allows him to define what the program is to analyze or search for in the survey results and then tallies and displays them in a printed report.

Finally, current active files on voice messages, survey data or report information can be saved by pressing F on the Master Menu, which provides the File Survey Information Menu.

DETAILED OPERATION

In more detail, and referring back now to FIGS. 3 and 4, it will be appreciated that the Master Unit is initialized from the personal computer via the RS232 interface as follows:

To record the voice, computer 18 sends the command via RS232 to the Master CPU telling it to activate the recording section, and whatever is spoken goes through microphone 28, amplifier 72, then buffer 74, then A/D converter 76, then synthesizer 84, then encode/decode buffer 86, and then is transmitted to memory 88. At this point buffer 86 is acting as a encoder since it takes the data coming in and encodes it into the data which can be stored in the dynamic RAM for speech storage. Samples of the speech are clocked into the dynamic RAM until the appropriate key on the keyboard is depressed, which sends a signal to the RS232 interface to instruct the CPU to stop the incoming audio signal. At this point, the Master CPU does not grab the data, but rather ignores it regardless of the fact that the LED bar graph on the Master Unit will still go up and down whenever somebody speaks. Therefore one can adjust the microphone and voice volume without actually putting it in the memory. More specifically, when the appropriate key on the keyboard is depressed, the program in computer 18 converts that key into a particular token which the CPU recognizes as being the token to record voice. Therefore, the CPU starts storing voice data sequentially in memory. The CPU will continue doing this until the user stops recording or the Master Unit runs out of memory. If the Master Unit runs out of memory, all future data coming in is ignored and an error code is generated and displayed. In one embodiment computer 18 displays exactly how much data is in memory, so that for each phrase of a message one knows how much memory and time have been used up and how many seconds one has left.

Once the information is stored in the memory, scratch pad memory 120 produces pointers to memory 88 which tells where messages start and stop. For instance, if one were to record a message and this is a message that might start at zero and end at 7,000 hex, when this message is complete, the operator instructs the Master Unit to play the memory. This sends another token down to the CPU of the Master Unit, which then goes to the beginning of the memory as indicated by the dynamic RAM. This starts memory 88 sequentially from the beginning at 000 all the way to the end address. The Master memory's CPU provides instructions to take the data from DRAM 88 and encode it back into a synthesized voice which then goes out through an internal monitor speaker 30. When voice is played, the raw data is taken from the memory 88, synthesizes it, and couples it out to speaker 30 so that an operator can listen to it and see if that is what he wants. After the operator listens to the message, he might decide that he might want to cut off some of the front end audio. It might have too much dead space or it might have a phrase altogether that he does not want. So by keyboard control of the computer, the operator instructs the deletion of a fraction of a second from memory. That sends a token over the RS232 interface to the CPU which then grabs the beginning pointer of the memory as pointed to in the scratch pad memory 120 and increments it by the amount of bites required to actually represent a half second of speech. What is now saved is a new starting address which results in the deletion of the first half second from the message.

Every time the operator hits a key to "delete", more speech will be deleted from the beginning of the message. So every time one sends a "delete" it will move that pointer up by a half second's worth of memory. Now the operator can depress the "play" button, and the whole process of playing will begin again. Now instead of starting at 000, it might start at 200 hex or 2,000 hex depending on how far up the pointer is moved. Note that all deleted speech is still in the memory. It simply is just not played from its initial starting point.

Now, if the operator decides he went too far forward after he has played the message and he wants to go back a little, the operator can undo some of the deleting so that he can back up the same way at half second increments until he hears the beginning of what he wants. So theoretically one plays the message to see if that is what one wanted. If it is not, one stops the play and decrements again until one hears the message the way one wants. This same editing process can be used for the end of a message, as well as its beginning. Thus, the purpose of the RAM with respect to the CPU as a scratch pad memory is to, at least, control the editing process.

The scratch pad memory or RAM also keeps track of the active TIUs that are connected to the Master Unit. This is done at the power-on sequence. The Master Unit goes through and polls every possible TIU number and TIUs that answered, with stored data being active in the scratch pad RAM. The RAM also contains a lot of miscellaneous variables that the Master Unit needs to perform functions that are unique for their particular purpose and are ignored after that.

Thus, the main function of the RAM is to keep track of memory 88 for how big the message is and to keep track of the flow chart that comes from the RS232 interface. It also keeps track of telephone numbers in the same way. It is acting as a go-between, between the RS232 interface and the TIUs for almost everything. The scratch pad memory 120 is a temporary storage memory before the Master Unit can send data to each of the individual TIUs. Likewise, when the TIU sends an answer to the Master Unit, RAM 120 saves the data until computer 18 is ready to receive and then it transmits this data over the RS232 interface to computer 18.

The PROM carries the code of the program for the CPU. The scratch pad RAM is strictly a variable and the PROM is the actual controller, always in control of the CPU as far as telling it what to do and what sequence to follow. The PROM and the RAM can be thought of as one entire block of memory. The fact that the PROM is not changeable and the RAM is, is not relevant for purposes of the present discussion because the CPU can only address one place at a time. So when the CPU goes to the PROM it addresses only the PROM and if it needs to get a variable, it will go only to the RAM. It will never address more than one address at one time. So, therefore, the PROM is always addressed by itself, as is the RAM.

It is important to note that the Master Unit produces only one voice message at a time and that once a message is completed, it is transferred to all of the TIUs simultaneously.

There are several lines used for communication between the Master Unit and the TIU. These are the NMI, the INT, the TIU READY, the data lines and the data strobe. The NMI indicates a nonmaskable interrupt to the TIU's. As far as the CPU is concerned, this is a line which the Master Unit's CPU 92 pulses to indicate to all TIUs that the CPU is about to send an address. All TIUs see this signal and all look at it and depending on their state, they will then wait for the data to come from the Master Unit. If they are already polling somebody, they will ignore the NMI. So the NMI indicates that an address follows.

The next line, the interrupt (INT) line, indicates to a TIU that a data byte has arrived. What that data byte indicates is based on a particular sequence of protocol, but the interrupt line does tell the TIU that data has arrived and also creates an interrupt on a TIU processor.

The TIU READY line is a line that all TIUs are hooked up to sequentially, and if any one of the polled TIU READY lines is high, then it stays high. What this does is allow the Master Unit to know when all the TIUs are completed with particular data communication. For instance, if a TIU is taking a long time to process a particular byte, the corresponding TIU READY line will stay high until the TIU is ready, and the Master Unit will wait for that line to go low, for a certain amount of time. Thus, the Master Unit will not send a byte before a TIU is ready for it. The two data busses themselves are all the standard 8 bit data lines. The strobes for the data busses indicate to the Master Unit that data has arrived from the TIU and visa versa.

FORMATTING

The person operating the Computer 18 will send a token to the CPU of the Master Unit instructing that data be sent to the TIUs. The CPU of the Master Unit 92 will then address all the TIUs. In other words, it will tell all TIUs present to be prepared to receive voice data. It will then send the name of that particular message, for instance, the letter "A", followed by an end of text code, followed by all the voice data corresponding to message "A"; and when it is done sending out the message, it stops the transmission by sending out an end of transmission code. The TIUs will then realize that that is a complete message, and they themselves will store it with a start and end address so they know where to play that particular message. The result of the foregoing is that one message has been labeled, such as by the letter "A", and has been stored in this particular configuration in the dynamic memory of each of the TIUs. It is then up to the operator to program the flow of the messages; in other words how the messages are to be spoken, which one comes before the next, and also whether the TIU is to wait for an answer, and what type of answer to wait for, as well as what action is to be taken based on the answer received. This is done by what is called a flow chart, which consists of a series of letters and symbols indicating how the polling is to proceed.

FLOW CHART SYMBOLS AND FUNCTIONS

Each letter indicates what message the TIU should send out. For instance, if there is an "A" in the flow chart, that is telling the TIU to say message "A" whatever it may be. Following the letter an "action" group tells the TIU what to do after the message corresponding to the letter is communicated. Unique to the coding system is that a character is used to designate to look for a given return number, a given number of return numbers, or a number that must exist within a given set of numbers, i.e., a "$"; an """; or "@". Another character is a ":", this is used to branch either to a Touch Tone message cycle or to a rotary dial message code depending on the type of telephone that was detected previously. For instance, if the letter is followed by another letter, that means go speak the second message. If the letter is followed by a dollar sign and a number, that indicates that the TIU should wait and allow as a valid response, any digit from 1 up to that number. For instance A$3 means say message "A" and then wait and allow as a valid response, the number 1, 2, or 3 from the recipient.

There are three other types of flow chart symbols and, there are 8 different ways a flow chart can be written. One way is two letters in combination, for instance AB, that says say message "A" and then go and say message "B". Another way would be with a dollar sign for instance, A$3B. This means say message "A", wait for a number up to 3 and then go to message "B". A$5B for instance, means one responds with digits 1, 2, 3, 4, or 5 and then go to message 8.

Another type of flow chart character is the "at" sign, "@", and it works the same way as the dollar sign, except in this case it is the number of digits to accept. For instance, A@3B means accept a number up to three digits in length and then go to message "B".

Another type of flow chart character is the an apostrophe "'". A'3B means wait for a number having exactly 3 digits. This forces the recipient to type in the number of charaters expected. For instance, if one asks for the recipient's social security number, this will come back with an error if the recipient does not type in the exact amount of digits required.

Another type of flow character is a full colon, ":". For instance, a full colon allows the person controlling the flow chart to base a decision on what type of telephone the person called has. By way of example, if one reaches a Touch Tone telephone one may want to ask the recipient one question. If a rotary telephone is reached, one may want to ask the recipient a different question. One does this by using a full colon. For instance, A:CB means if a rotary telephone is detected go to message "C", and if it is a Touch Tone, go to message "B". This is the type of code needed when one is trying to get an age limit or some large number of digits coming in. If the system reaches a rotary telephone, one can't go above a "3" due to constraints discussed hereinafter. In this case, one has to ask the questions differently.

The standard way of operating is, for instance, A1B2C3D. What this means is that one transmits a message "A" and then waits for a number. If the recipient responds with a "1", message "B" would be transmitted. If the recipient responds with a "2", the system transmits message "C" because the letter following the number "2" is a "C". Thus one can branch based on an individual number. Moreover, one can branch to the same letter by several different paths.

A semi-colon indicates that this is an end message and is used for two reasons. One is where one says a message where one does not want to ask any more questions. Termination is accomplished with a semi-colon. Another reason is that if there is an error at any time from the recipient and one wants to terminate the call, the semi-colon is used. In the subject system flow chart, the system will automatically go to a message corresponding to the letter previous to a semi-colon and hang up the telephone. For instance, if one has an "A;" this means transmit message "A" and hang up. If the flow chart is, for instance A1B2Z-Z;. then this means if the recipient responds with a "2" to message "A" go to message "Z". Message "Z" says say message "Z" and hang up because there is a semi-colon after the Z. Likewise, if one provides a flow chart that says A$3B and the person does not answer with a number "1", "2" or "3"; for instance, they respond with a "4" twice in a row, then the TIU will look to the first letter previous to the first semi-colon, in our example Z, and say that message and hang up. This is useful for having a closing message such as "Thank you very much. Goodbye." So if somebody doesn't understand what to do twice in a row, the system can still politely hang up without just clicking off. The twice-in-a-row feature is preprogrammed into the flow chart automatically, with a wrong answer resulting in a message retry.

The last character of the subject flow chart system is a period, and this indicates to the TIU that there is no further flow chart information.

With repsect to the use of a dash "-", and considering A1B2C3E-BD-CF-D;-EB-FD, the dash separates action groups. Also when the TIU is looking for message B, since the person answers "A" with "1", "-B" is found instead of EB. So the letter immediately following a dash is the one that is branched to and spoken.

EXAMPLE

The flow chart, in simplified form, may be AB-B1C2D3E-E;-CD-D;. This can be interpreted as follows: Each section of this chart is an individual entity on its own. The AB in this case is the start point, and each subsequent section is started with a dash. Note, the first letter of a flow chart has an "Implied" dash, i.e., -AB. Thereafter there is a complete section unto its own. In every case the letter which is indicated first such as the "A" is the message in question which is spoken. For -B1C2D3E message "B" would be the message that was spoken. Any letter or numbers that follow the first letter tells the computer what to do next. Now following through one at a time, for the above format message "A" is spoken and then the computer hunts for the next character, which is a letter, message "B". To find it the computer starts at the first position and moves until the computer finds a "-B", at which point it stops and says message "B". The next thing following message "B" is a number, so the computer immediately knows that a response is expected and the person must dial a "1", "2", or "3". If a "1" is received, it is compared to a "1" in the RAM, and if they compare, the computer then moves to the next message, and it should go to message "C". The computer then starts at the start point and works its way through the flow chart looking for a "-C" and when found it says message "C". Since the next character is a "D", it will then look for a "-D" starting at the front of the flow chart and works its way through to a "-D". It will then say the "D" message. The next character is a semi-colon. This indicates that the survey of this person is complete. The telephone is then hung up. Going back again, if message "B" had been annunciated and the party on the other end of the line dialed a "2", the comparator would look at the "1" and find that it would not equal what was dialed back. So the computer would skip over the "C" message and look at the next character which is a "2". Having compared it to "2" the computer would move on to the next character which is a "D" and then hunt for a "-D" message starting at the front of the flow chart and work its way down until it found the "-D". Then the "D" message is said. The semi-colon then indicates that the system is to hang up. If the recipient erroneously dialed a "4" which is not contained in the flow chart at all, the "B" message would have been said. The program now goes back with a "4" comparing it with a "1". It does not compare, so two places are skipped to the next character which in this case the number "2". This does not match the "4", so two places are skipped again to the "3". This does not match the "4" either. The computer then looks two spaces over for the next number, but there is no next number. There is a dash. When the computer finds the dash it says the party did not dial one of the digits defined by the flow chart and checks to see if message "B" has been said twice. If not, then message "B" is repeated. If the same thing happens and a "4" or any other invalid response is dialed, the computer determines that an error was made two times in a row. The program then goes to the first letter which has a semicolon following it. So starting at the front of the sequence, the computer would roll down until it finds a semicolon, back up one space where it finds "E", and it says message "E". It simply would say "Thank you very much. Goodbye."

PHONE NUMBER GENERATION

In one embodiment, telephone number selection is one of two types. One is a random number generator, and the other is a user list from which numbers are supplied. In one embodiment, for random number generation on computer 18, the operator supplies up to 300 different exchanges and pre-exchange information, for instance area codes, and then decides how many numbers are to be generated for each exchange during a particular survey. A random number is then the four last digits of a telephone number. For instance, on exchange 295, the computer would create a random number from 0000 to 9999 and append the randomly-generated number to exchange 295. It will be appreciated that the random numbers are created at computer 18 through the utilization of any one of many common random number generating routines. Once the random number is generated computer 18 will then send it to CPU 92. CPU 92 will then place the telephone number in RAM 120.

Once the Master Unit has a number for a TIU, it compares the pre and exchange information (i.e the NON-random part of the number) to see if it is the same as was received interface from the RS232. If the pre and exchange numbers have been changed, the Master Unit will send them to the TIU first. In either case, the Master Unit will then send the four remaining digits (the random part) to the TIU. Once the TIU has that telephone number it will automatically go through the dialing and and polling process as indicated with the flow chart and the voice that it already has.

What happens is that the Master Unit on the first pass will send the entire telephone number to a TIU and keep track of the exchange and the telephone number which are separate. The next telephone number which the Master Unit is asked to send will be checked against the last one that was sent, and if the exchange is the same, it knows that the TIU has the same exchange. Therefore it will only send the four digits. The TIU does not send anything back to the Master Unit which simply remembers what it initially sent to the particular TIU. Any time the exchange is changed, then the Master Unit will resend and keep track of the new exchange. At this point the TIU has the voice and the flow chart required for a survey and it has at least one telephone number in it. The Master Unit then polls all TIUs until one of them comes back with a status indicating that they have an answer from a recipient. The Master Unit will then indentify that particular TIU and read the response from the recipient. For instance, if the recipient answered "2" to message "A", the Master Unit will get a message that has "A2" in it to indicate that is how the user answered the question. The Master Unit will store this result in its scratch pad memory 120, and then it will wait for the RS232 interface to poll it and give the RS232 interface an indication that it has an answer and likewise will send the answer from RAM 120 out the RS232 interface to computer 18, which will then append the telephone it sent to the TIU and store the results on disc. The Master Unit will then indicate to computer 18 that it needs a new telephone number for that same TIU. Computer 18 then generates a random number or a user list number, and sends it down to CPU 92, keeping track of which number went to each TIU. CPU 92 saves it in RAM 120 and automatically turns around and transmits that telephone number back to the TIU that gave it the answer. The TIU then takes that number and takes the next survey. Meanwhile, the Master Unit begins polling for the next available TIU. This sequence is repeated. It will be apparent from this description that the TIUs do not operate completely independently. They do, however, operate independently with respect to the polling; but with respect to the transmission of the polled information back to computer 18 for analysis and also for obtaining the telephone numbers, the Master Unit must be connected to the TIUs. Thus, the TIUs are able to go through the polling sequence once the telephone number has been dialed and they are independent of each other in the sense that they can dial up on different telephone lines, take a poll and record the results.

OPERATION OF THE TIU

Referring now to FIGS. 4A and 4B, and the operation of a TIU, one of the biggest differences between the TIU and the Master Unit is that the TIU has enough memory for four times the amount of memory that the Master Unit has. Memory 252 thus allows one to have several messages in the memory at one time, approximately 6 minutes of messages in one embodiment. The CPU of the TIU acts a lot like the CPU of the Master Unit in that it accepts commands from the Master Unit just as the Master Unit's CPU accepts commands from the RS232 interface. The CPU has a PROM to control it just as the Master Unit does, and it also a has scratch pad RAM like that of the Master Unit, which is used to save the flow chart and the particular telephone number. It is also used to save the results from the recipient that it will send back to the Master Unit. Once the four digits of the telephone number are received, the TIU dials the telephone number based on the telephone number in its memory.

The TIU contains the capacity to store 6 minutes of speech, which can be made up of several messages that can be randomly accessed and thus spoken in any required order.

It also contains a scratch pad memory where the telephone number to be dialed is entered, as is the flow chart of messages, a map of the storage position of the various messages and an area for answers and other return data to be sent back to the Master Unit upon request. The PROM contains the control code to operate the TIU.

The messages are sent to all the TIUs in parallel. The remaining required data, the flow chart sequence and the telephone number must be sent individually to each TIU and the exactness verified before acceptance for use.

The messages and message flow chart must first be transferred from the Master Unit to the TIUs. During operation, the Master Unit polls the TIU looking for an inactive TIU, and when found, the TIU status and last message data is sent to the Master Unit for later analysis by computer 18. The Master Unit then transfers a telephone number from computer 18 to the TIU. Upon receipt of the last four digits of the telephone number, the TIU is activated to start the call, and the telephone number is dialed, either rotary or DTMF, as per the setting of an internal TIU switch. The TIU then analyzes the signals coming from the telephone line via interface buffer and amplifier 302 to find out whether it is a busy, a ring, noise, a SIT tone, or too much audio, indicating an answering machine. Upon recognition that a person has answered, the TIU will then voice the first message per the flow chart and if no answer is required, will then voice the next message. If an answer is required, the TIU will then wait for an answer. Once the recipient answers, the TIU will analyze that answer and see if it is a valid answer. If it is not a valid answer, it will repeat the question one more time, and if it does not get a valid answer again it will voice the first message in the flow chart with a semicolon following it, this being a termination message. A valid answer, is for instance, with a flow chart of A$3B, any number 1, 2, or 3, after the message "A" has been spoken. A "4", for instance, would not be a valid answer. An invalid answer is also "no" answer. If the recipient did not understand the question and did not respond right away, after a certain amount of time the question is repeated. This sequence of one repeat if required is for every question asked.

With respect to the analysis of the types of signals that are incoming, there is a DTMF decoder, an audio present amplifier and comparator, a call progress detector including a dial tone, busy, and ring output, a ring in detector, and some software detection utilizing the signals from the audio present detector and comparator to detect various conditions which can exist for the incoming signal to the telephone line interface buffer and amplifier 302.

In operation, the hardware portion of the input signal recognition detects dial tones, busy signals, rings, Touch Tones, and ring-in. The software detects rings, busy signals, SIT tones, voice, noise, and rotary dialing. In one embodiment the hardware outputs, are dominant or chosen over software outputs with software outputs being used if there are no available hardware outputs. Actually, the only duplication is for rings and busy signals, with the hardware outputs taking precedence.

A typical sequence for operation of the polling unit would be as follows: An unused TIU is identified as being capable of receiving a telephone number generated by computer 18. Thereafter, the particular telephone number to be dialed is computed by computer 18 and is interfaced through the Master Unit to the particular addressed TIU. The TIU upon command from computer 18 through data interface subsystem 292 causes either dial pulse generation or tone generation of the telephone number, which is placed on a particular telephone line. Thereafter, the audio present amplifier and comparator, the call progress detector and the DTMF decoder are each ready to analyze the incoming signals. Based on the receipt of voice coming back through on the telephone line which is validated, the flow chart is implemented.

SOFTWARE SIGNAL ANALYSIS

With respect to the software analysis of the incoming signal, this is accomplished within the TIU. After the telephone is dialed, the TIU will then start monitoring the audio present line 310. It will wait for any signal coming in from the telephone line which will be amplified by unit 302 that feeds the audio present line 310. The audio present line is a digital 1 or 0 based on the audio signal. This particular line is sampled repeatedly by the TIU and a rough approximation of the audio is then brought into the TIU. For instance, if it samples and sees the audio present line is high for X amount of time and low for X amount of time, this represents a frequency which the TIU then keeps track of in a series of frequency slots in its scratch pad RAM at 220. After there is a certain amount of silence, the TIU will then go back and look at the scratch pad RAM and analyze what frequencies have been detected and how much of those particular freqencies it saw. More particularly, the audio present circuit clips the audio into square waves, providing a series of pulses corresponding to this audio signal. The time between adjacent pulses determines the frequency of the incoming signal, from which the type of incoming signal can be deduced. In one embodiment, the frequency is not directly measured. Rather, the existence of numbers of pulses of various frequencies over various predetermined periods of time determines the type of incoming signal.

Thus, with respect to the software signal recognition, the audio present circuit produces a series of pulses by which the system recognizes ring, busy, noise, and voice signals. Should this analysis, done via software, fail to sense anything within 21 seconds, the call may be terminated. The program for determining the type of signal is in PROM 218, which analyzes the data in the RAM via the CPU. Note, a local ring signal is a combination of specific frequencies. However, for certain long distance calls the ring signals come in at all types of frequencies including broken up noise which sounds like brrrrrr. The subject software can detect all of the different types of rings, while the Teltone model 982 call progress detector can only detect a local ring from modern telephone equipment using a 440 Hz and 480 Hz multiple frequency ring signal.

RING, BUSY, NOISE, VOICE DETECTION

With respect to the detection of a ring signal by software this is detected by spectral distribution and by the presence of incoming pulses existing, for instance, for 2 seconds followed by a 4 second period of quiet, or 1 second of pulses followed by 5 seconds of quiet. It will be appreciated that noise usually comes in as short bursts and is ignored. Thus if a series of pulses comes in and is detected for a time interval less than 120 milliseconds, it is considered to be noise and is ignored.

With respect to a busy signal, pulses from the audio present amplifier and comparator have a prescribed spectral distribution and will be present for a half second and quiet for a half second, with a repetition of this sequence. Or a reorder signal will exist in which a quarter second of signal will exist, followed by a quarter second of quiet in a repeating cycle. Either one of the aforementioned conditions is determined to be a busy signal.

Voice signals are detected as follows. Any signal which is existing between rings longer than noise but shorter than the inter-ring interval and with a particular spectral distribution is determined to be voice.

For more sophisticated determinations, a voice, a ring, or a busy condition can be verified by virtue of frequency determinations for the signals on the line, with certain frequencies being more characteristic of rings versus busy or voice signals. For instance, at selected time periods data is stored with respect to the frequencies of the incoming signal, with the data being analyzed at preselected times to verify or further indicate the type of signal which is on the line. Thus, for instance, should leading edges be counted, a certain number of counts should exist over a predetermined time period if the incoming signal is a ring signal. If this number varies significantly from that which is expected, then further analysis is necessary. In one embodiment, for instance, 16 frequency channels are developed, each recording the existence of a signal of a given frequency or frequencies. The highest channel assumes frequencies at or above a certain frequency, whereas the lowest channel assumes frequencies at or below another certain frequency. Depending on how many counts are in which channels, it is possible to determine what the type of signal is on the telephone line.

With respect to the operations that follow, detection of the type of signal on the line, and more particularly with respect to a ring, the number of rings are counted and should there be more than a predetermined number of rings without an Off-Hook indication, the Subject System hangs up and terminates the call. Should a busy signal be detected by a predetermined number of busys, the call is likewise terminated. The status of whether they are rings or busy signals or whether everything proceeded normally is temporarily stored at the TIU. The TIU then remains inactive until it is polled by the Master Unit, at which time it transfers the information through the Master Unit to computer 18.

Upon detection of a voice signal such as "Hello", the system waits a half second and then the polling sequence is started according to the flow chart which has been stored in the TIU memory. While it might be thought that it is possible to start the polling sequence with the Off-Hook detection, this has proved to be unreliable in many circumstances, as it is possible to start the polling sequence before the recipient gets the handset to his ear.

It will be appreciated that the CPU in the TIU can either cause synthesized voice to be transmitted or can analyze incoming data but not both at once. If during the interval between two rings, there has been a miscalculation as to the type of signal on the telephone line, and the synthesizer voice has been placed on the line, then the periodic checking of the call progress detector will indicate that another ring has occurred and the TIU can be reset to terminate the message erroneously started.

PULSE DIALING DETECTION

The system can read in results sent by either Touch Tone or rotary dialed telephones. It is thus important for the system to be able to detect pulse dialing and a pulse dialing detection system is accomplished in software, with the number of pulses existing within a predetermined time period followed by a predetermined silence period indicating that a pulse dialing system is being used by the recipient. There are two different problems in detecting pulse dialing. On local lines when one dials a digit "1", one obtains a characteristic make/break pulsing on the line. The "2" is the same thing repeated twice. A "3", of course, is a make/break repeated 3 times. Beyond that, the signals coming back over the telephone lines are not reliable, especially long distance. While locally it is possible to detect any digit, with long distance one cannot rely on anything over 3.

While this particular make/break footprint of a number of pulses within a predetermined time period is useful for the detection of pulse dialing, there are so many unknowns via long distance lines that a dialed "2" from one area may look like a dialed 3 from another area. Thus one might be forced to use a system that will ask the recipient to dial a "2"; and then based on the data received in a given time interval, a baseline would be established, and all other responses are related to this baseline count. Thus, when a "1" or a "3" is dialed, the received data time interval will be less or more. The system software is initialized by asking the recipient to utilize his own telephone to dial a specific number such as "2" and measuring the time interval of signal produced by his dialing of the number "2". Then by analysis of the signal coming back over the line, a "1" can be deciphered or a "3" can be deciphered based on the amount of relative signal produced on the telephone line. This eliminates the problem of various telephone systems and lines, as well as instruments that produce the make/break signals, be they the standard rotary make/break relays or synthesized make/break relay telephones. In other words, a number "1" would be one half the signal associated with a "2"; and a "3" would be one and a half times the signal associated with a "2".

CONCLUSION

In summary, the subject system has the following features:

First, the subject system utilizes multiple, identical voice synthesizers, with identical voice synthesizers being utilized in number of Telephone Interface Units for simultaneous polling over numbers of lines, for reliability, and for ease of access to permit fast random access branching that eliminates "dead time". The utilization of multiple identical voice synthesizers permits uniform polling voices to be utilized so that the results are not skewed. The utilization of multiple identical speech synthesizers also provides a much smaller package than is possible with tape machines, and is not prone to tape breakage or destruction.

Secondly, the use of a personal computer or other local computer permits message set up and editing, telephone number generation, and TIU polling in a token-passing system for a number of identically-configured Telephone Interface Units. Each TIU operates independently for simultaneous polling and receipt of information over a number of dedicated telephone lines once the telephone number has been inputted from the personal computer. Cross-correlation of received information is made possible with the use of a Master Unit serving as an interface to the Telephone Interface Units to provide a unique on-site capability for the polling system.

A further feature is a programming code unique to polling operations which makes the subject system exceptionally easy to program.

. Moreover, the elimination of "dead time" is a result of initial easy message editing; a quick branching process is accomplished through the aforementioned utilization of the synthesizers and memories within the Telephone Interface Units; the utilization of an exceptionally efficient, rapid incoming signal recognition system; and a system of ignoring noise between rings or busy signals so that noise is not acted upon erroneously.

Further, on-line, real-time, cross-correlated statistics generation from multiple answers, as opposed to a single answer statistics, is an important feature of the subject system.

The aforementioned rapid signal identification is a result of software operating on a clipped incoming signal, with the interpulse spacing then determining the frequency, and thus the type of signal that is coming in over the telephone line. This system can reliably distinguish a ring signal, a busy signal, a voice signal, a recording machine, or noise, and permits a software rather than a hardware implementation of signal recognition.

Additionally, and importantly, branching in the subject system may be based on answers and more particularly can be based on either a non-response to a particular question or an erroneous answer. Branching on either a non-response or an erroneous answer is particularly important in polling because it prevents contamination in the polling with erroneous answers. Thus, the result of the polling process is the result of obtaining valid answers and assures more accurate results with the minimum of annoyance for those participating in the poll. In one embodiment such branching takes place only after the question has been re-asked after an invlaid answer. Moreover, a voice signal once detected will result in the running of the poll, whereas a predetermined number of ring or busy will terminate the call. SIT detection will also terminate the call.

Further, the subject polling system utilized permits selection of telephone groupings in terms of exchanges in which the first three digits are selected for given areas, followed by random number generation to permit convenient designation of polling areas followed by complete randomness in recipient selection, with this type of telephone number generation permitting rapid analysis by area in terms of the exchanges designated.

Additionally, one of the aspects of the subject invention is the inactivation of the polling process after compiling a predetermined number of valid responses. This system, while it may be operated to poll over a given time period, can be made to poll over such time as is necessary to provide a predetermined number of valid responses. This can be combined with the prevention of polling at certain periods of the day or polling at predetermined periods of the day. Regardless of when the polling system is set to operate, it is the determination of a predetermined number of valid responses, which in one embodiment, shuts down the polling process.

Moreover, the subject system can be configured rapidly into a "call out" polling system such as described or a "call in only" polling system in which there is no call out feature. The public telephone network can be used to automatically determine which of the Telephone Interface Units are free to receive an incoming call.

Further, a pulse dialing detection system is provided in which the detection of a pulse dialing telephone at the recipient's site is determined by a footprint match of number of pulses followed by a predetermined silence. The pulse dialing detection is also enhanced through a system which requests a recipient having a pulse dialing telephone to dial a predetermined number which produces a certain noise time pattern from which other dialed numbers can be determined.

It will be appreciated that the above features can be taken either singly or in combination.

Having above indicated a preferred embodiment of the present invention, it will occur to those skilled in the art that modifications and alternatives can be practiced within the spirit of invention. It is accordingly intended to define the scope of the invention only as indicated in the following claims.

What is claimed is:

1. In an automatic telephone polling system having numbers of telephone interface units, each connected to a different line and each having a digitally-driven speech synthesis system, means for programming said units including a master unit having the same type speech synthesis system, whereby all telephone interface units can be easily simultaneously and initially programmed with the same messages from the master unit, and whereby all polling from the telephone interface units will have a uniformity dictated by the speech synthesis generated by the master unit.

2. A system for conducting simultaneous information exchange over a number of telephone lines, including both DTMF and rotary/pulse signals, comprising:
   a number of individually-programmed telephone interface units for transmitting microphone-recorded predetermined voice messages over respective telephone lines and for receiving live information transmitted over the corresponding telephone line from an individual at the other end of a telephone line, each telephone interface unit operating independently once connected to a telephone line; and
   computer means connected to each telephone interface unit for programming said unit prior to its connection to a telephone line;
   each said telephone interface unit including means for storing responses received from said individual as ASCII characters, said computer means including means for collecting said responses in each telephone interface unit.

3. The system of claim 2 wherein said computer means includes means for cross-correlating stored data and for displaying the results of the correlation.

4. A system for conducting a poll comprising:
   a computer, a computer program for setting up the poll format, for designating a set of telephone numbers, and for storing the results of the poll taken;
   a number of substantially-identical telephone interface units coupled one each to a different telephone line, and each having its own microcomputer and storage, a voice synthesizer, and means for recognizing types of incoming signals; and
   a master unit for operably connecting the telephone interface units to said computer during initialization of the telephone interface units, to provide a telephone number to a telephone interface unit, and only to recover information stored in the telephone interface unit whereby each telephone interface unit operates independently of said computer during a polling sequence.

5. The system of claim 4 wherein said master unit includes a master unit voice synthesizer having a digital-to-analog converter and means for programming said master unit voice synthesizer under control of said computer, with said programming means including a microphone, an analog-to-digital converter, storage means, audio reproduction means coupled to said voice synthesizer, and means for reading out said storage means to said master unit voice synthesizer.

6. The system of claim 4 wherein the voice synthesizer of said master unit is substantially identical to those of said telephone interface units to facilitate the programming of each telephone interface unit with identical sounding messages.

7. The system of claim 4 wherein said master unit includes means for storing both messages and formatting instructions, and means for transmitting messages and formatting instructions to each of said telephone interface units.

8. The system of claim 4 wherein each of said telephone interface units includes both hardware and software means for determining the types of incoming signals.

9. The system of claim 8 wherein said software means includes a hardware clipping circuit and means for determining the time between adjacent pulses produced by said clipping circuit, thereby to permit derivation of the frequency of an incoming signal.

10. The system of claim 8 wherein said software means includes means for sampling any incoming signal at predetermined times and for storing the frequency or frequencies of said incoming signal in frequency bins so as to provide a rough spectral analysis of the incoming telephone signals.

11. The system of claim 8 wherein said software means includes means responsive to a predetermined spectral analysis for branching to a predetermined portion of said poll format.

12. The system of claim 4 wherein said system includes a digitally-driven voice synthesizer, digital storage means for digitally storing a message to be transmitted, and means for changing the start and end addresses of said digital storage means for trimming said message and thus trimming dead time out of said polling sequence.

13. The system of claim 5 which includes a digitally-driven voice synthesizer, whereby a message can be trimmed and whereby branching to given messages can be made natural sounding.

* * * * *